US008566171B2

(12) United States Patent
Rogondino et al.

(10) Patent No.: US 8,566,171 B2
(45) Date of Patent: Oct. 22, 2013

(54) DIGITAL MEDIA ARCHIVE COLLECTIBLE DEFINED BY VARIABLE COLLECTABILITY ATTRIBUTES

(76) Inventors: Michal Anne Rogondino, Honolulu, HI (US); Jeffrey Hokit, San Luis Obislpo, CA (US)

(*) Notice: Subject to any disclaimer, the term of this patent is extended or adjusted under 35 U.S.C. 154(b) by 665 days.

(21) Appl. No.: 12/728,103

(22) Filed: Mar. 19, 2010

(65) Prior Publication Data
US 2010/0241524 A1    Sep. 23, 2010

Related U.S. Application Data

(60) Provisional application No. 61/162,066, filed on Mar. 20, 2009.

(51) Int. Cl.
*G06Q 30/00* (2012.01)
(52) U.S. Cl.
USPC ........... 705/26.1; 705/27.1; 705/26.9; 705/37
(58) Field of Classification Search
USPC ................................................ 705/26, 27, 37
See application file for complete search history.

(56) References Cited

U.S. PATENT DOCUMENTS

| | | | |
|---|---|---|---|
| 6,119,229 A * | 9/2000 | Martinez et al. ................ | 726/28 |
| 6,401,033 B1 | 6/2002 | Paulauskas et al. | |
| 7,249,139 B2 * | 7/2007 | Chuah et al. ......................... | 1/1 |
| 7,921,221 B2 * | 4/2011 | Minborg et al. .............. | 709/231 |
| 2001/0049606 A1 * | 12/2001 | Lucarelli .......................... | 705/1 |
| 2003/0233570 A1 * | 12/2003 | Kahn et al. ..................... | 713/200 |
| 2008/0167129 A1 * | 7/2008 | Aaron et al. ..................... | 463/42 |
| 2010/0079338 A1 * | 4/2010 | Wooden et al. .......... | 342/357.09 |

OTHER PUBLICATIONS

Geocaching Website: Internet Archive Wayback Machine; www.geocaching.com; Jan.-Mar. 2009, 61 pages.*
Garmin: "Garmin's Colorado™ Series Gives Outdoor Enthusiasts a New Perspective," PR Newswire Jan. 3, 2008, Dialog file 621 # 05261406, 3pgs.*
Wherigo.com: Internet Archive Wayback Machine; www.wherigo.com; Feb. 2009, 2pgs.*

* cited by examiner

*Primary Examiner* — Rob Pond
(74) *Attorney, Agent, or Firm* — Steven A. Nielsen; Allman & Nielsen, P.C.

(57) ABSTRACT

A system, sometimes called ShakyPlanet™ presents a collection of interactive digital objects, one of which is sometimes called ShakyGlobe™. The presented digital objects may be part of a series of eCollectibles™. A specialized and centralized communication and database system, sometimes called ShakyStore™ offers the sale of objects to buyers qualifying on the basis of various variables, such as being within a predefined geographic area or issuing a purchase request within a predefined time period. Additional conditions to purchase may include a willingness to pay more than standard established costs, purchasing before all units are sold and submission to the terms of sale that facilitate the collectable attributes of the objects. Each object is uniquely marked to identify its owner by registration with the communication and database system, which is the sole authority for the transfer ownership of the objects, the recording of ownership changes and for the authentication of the objects.

8 Claims, 12 Drawing Sheets

GEO AND TEMPORAL BASED GATHERING OF COLLECTABLE ARTIFACTS

-Successful Request for Collectible Artifact

400. Mobile User is within Geo-Fence
401. Mobile User requests to acquire a collectible artifact (CA)
402. Server verifies the request and permits the acquisition
403. Mobile User receives the collectible artifact (CA)

Digital map with globe icons indicating status/availability

ShakyGlobe™ Map Icons

-  Users current location ~ 2

-  ShakyGlobe is within geo-fence (retrievable) ~ 3

-  ShakyGlobe is outside of geo-fence (not retrievable) ~ 4

-  ShakyGlobe has been retrieved ~ 5

*Device within geo-fence and able to retrieve digital-object*

*Device outside of Geo-Fence and unable to retrieve digital-object*

Scale and align the image chosen

ShakyGlobes shown in a coverflow view

GEO AND TEMPORAL BASED GATHERING OF COLLECTABLE ARTIFACTS

-Successful Request for Collectible Artifact

400. Mobile User is within Geo-Fence
401. Mobile User requests to acquire a collectible artifact (CA)
402. Server verifies the request and permits the acquisition
403. Mobile User receives the collectible artifact (CA)

GEO AND TEMPORAL BASED GATHERING OF COLLECTABLE ARTIFACTS

-Un-Successful Request for Collectible Artifact

406. Mobile User is NOT within Geo-Fence
401. Mobile User requests to acquire a collectible artifact (CA)
405. Server verifies the request and denies the acquisition
404. Mobile User does NOT receive the collectible artifact (CA)

DIGITAL MEDIA ARCHIVE COLLECTIBLE DEFINED BY VARIABLE COLLECTABILITY ATTRIBUTES

CROSS-REFERENCE TO RELATED APPLICATIONS

This is a utility application based upon U.S. patent application Ser. No. 61/162,066 "Application for retrieval of travel based artifacts" filed on Mar. 20, 2009. This related application is incorporated herein by reference and made a part of this application. If any conflict arises between the disclosure of the invention in this utility application and that in the related provisional application, the disclosure in this utility application shall govern. Moreover, the inventors incorporate herein by reference any and all patents, patent applications, and other documents hard copy or electronic, cited or referred to in this application.

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever

BACKGROUND OF THE INVENTION (1) Field of the Invention

The invention generally relates to server systems, data base methods, graphical user interfaces, business methods, collectability attributes and applications created to facilitate the fabrication, presentation, authentication and transfer of collectable digital objects or other objects obtained by compliance with object attributes and system imposed constraints. More particularly, the invention relates to systems, methods, applications and devices directed toward the activity of collecting collectable items, such as digital objects, wherein the collectability or intrinsic value of the collected items may be enhanced by various hurdles to acquisition. For example, the collectability attributes of a presented item may include a limited number of system generated copies, a limited time period for purchase, a requirement to be within a predefined geographic area at the time of issuing a purchase order, a willingness to pay more than normally accepted prices and consent to system rules requiring system registration, system permission for item transfer and exclusive system use for item transfer and authentication.

(2) Description of the Related Art

In the related art of geocaching collection, a participant with in a community of geocaching hobbyists deposits various physical items, records the locations on a server and then another participant may download the locations from the server, find a deposited item, take or exchange the item and log the event on the server. In the related art, the process of travel, map reading or puzzle solving is the reward and the items obtained or exchanged are of no or little intrinsic value or collectable value as such items are deposited or exchanged on a volunteer basis. The related art lacks a centralized system and protocols for providing consumers a fulfilling collecting experience.

The related art lacks means of allowing consumers to collect items in the absence of private or secure ground space. Thus, the known art fails to provide means of interesting directed travel within urban areas where space for hiding objects is not legally available or physically feasible. The related art also is prone to encouraging physical digging into the ground to secure physical items and may require a participant to dig into the ground and disturb the flora and fauna of the area.

The related art lacks means of providing non fungible digital objects to correspond to locations reached. For example, U.S. Pat. No. 6,401,033 issued to Paulauskas et al on Jun. 4, 2002 discloses a game system wherein a consumer may solves puzzles, answers trivia questions, hunt for treasure or engage in other activity designed to entertain while traveling. Paulauskas fails to disclose a substitute for physical keepsakes typically obtained at destinations of interest. Paulauskas also fails to contemplate an application suitable for the transfer or acquisition of digital objects.

BRIEF SUMMARY OF THE INVENTION

The present invention overcomes shortfalls in the related art by presenting an unobvious and unique combination and configuration of servers, database protocols, software methods, graphical user interfaces, applications, system rules and constraints and other components to create a consumer experience wherein a centralized system may direct a consumer to certain locations within certain times to acquire or to qualify for the purchase or acquisition of digital objects and wherein such objects have attribute variables designed to increase their intrinsic value and collectability.

The disclosed system may present consumers with various pieces of information and challenges as part of the acquisition process of various digital objects. The disclosed application overcomes shortfalls in the related art by allowing consumers to communicate with a server system that discloses the locations of digital objects; whereas in the related art of geocaching, clues, directions, puzzles or GPS coordinates are given to consumers who are then required to locate, search out, and sometimes dig up, a physical object. In the related art of GPS travel entertainment as exemplified in Paulauskas, a consumer may learn facts about a location, but the consumer fails to acquire any trophy or evidence of a completed journey.

The present invention overcomes shortfalls in the related art by providing an application for the clean pursuit of electronic objects that are stored upon a system server, thus allowing a consumer the excitement of locating a certain geographic point or geographic area readily disclosed by the system, acquiring a digital object and enjoying the collection of the object by the required use of the system and system constraints.

The disclosed application has means to allow a consumer the opportunity to acquire electronic items or digital objects, which, in one embodiment, may take the form of a digital and animated representation of a snow globe, with user adjustable behaviors to amend the attributes of the displayed snow globe and related scenes.

Unlike objects traditional planted or exchanged in the related art, the current invention produces sets of digital objects that easily integrate into Personal Electronic Devices ("PEDs") such as iPhones™ and BlackBerries™. As many PEDs have GPS capabilities, a consumer, in most instances, does not need to purchase additional hardware to enjoy various aspects of the disclosed application or system.

The electronic nature of the presented digital objects allows operators of the disclosed system to customize the attributes and quantities of the digital objects as well as the conditions for transfer to a consumer. Unlike the related art of physical geocaching that may offer plastic toys, dog bones, and other unsavory items that are often soiled or partially decomposed by exposure to the earth and moisture, the } present invention offers environmentally sound digital objects of both intrinsic and extrinsic value to a consumer.

One embodiment of the invention contemplates the configuration, presentation, marketing, and sale of a digital snow globe, sometimes referred to herein a ShakyGlobe™. The invention includes an application purchased by consumers that enables consumers to acquire a series of ShakyGlobes™.

Intrinsic value is added to digital objects retrieved by consumers as the retrieval of such an item may be conditioned on a consumer's travel to a designated area within a geo fence. The boundaries of a geo fence may be varied to correlate with the marketed digital objects and/or location of interest. For example, to retrieve a ShakeyGlobe™ of Yankee Stadium a consumer may be required to travel to Yankee Stadium wherein a geo fence comprises all coordinates within the Yankee Stadium complex, or a point within the stadium and a defined radius. A geo fence may take the shape of a circle, an enclosed polygon, or may be three dimensional to conform to the topography of a given location.

The acquisition of a ShakeyGlobe™ may be considered analogous to the acquisition of a physical snow-globe featuring San Francisco landmarks. In either case, a visitor will enjoy the experience of obtaining and retaining a keepsake keyed to the location traveled. Some locations, such as Time Square are known for selling t-shirts to tourists who may not wear or display the t-shirts in their daily lives. The present invention provides alternative digital keepsake that is far easier to transport and display within our digital world.

An optional variable of time may be added as a condition precedent to a consumer retrieving a ShakyGlobe™ or other object. For example, a ShakyGlobe™ marketed to participants of the Boston Marathon may require consumers to be on the marathon route during the time window of the marathon. When the marathon is over, no further Boston Marathon ShakyGlobes™ would be available until the next year.

The acquisition of a digital object may be viewed as analogous to the winning of a trophy or medal, giving the consumer bragging rights, prestige and/or a keepsake memorializing a task well done, a place traveled or the participation of a particular event held within a particular location.

Extrinsic value is added to digital objects presented by the disclosed system or application. The digital objects produced by the system are made non fungible in various ways. Each digital object may comprise a unique collection of digital media or digital content that may reflect the location and time of retrieval by a consumer, a theme or genre, serialization, disclosure of total units issued, and customization options selected by the consumer.

The extrinsic value of digital objects is further enhanced by the creation of a secondary market used for buying or selling of items produced by the system. A database and display interface disclosing the status and history of each digital object ensures the authenticity and collectability of each digital object. Such a database and interface also allows operators of the disclosed system to reward loyal consumers by writing articles commemorating the exploits of the loyal customer.

An optional digital bookshelf display system and interface presented by the system enhances both the intrinsic and extrinsic value of the digital objects. Consumers may customize the display of their digital objects for their own enjoyment and for the marketing of their digital objects within a secondary market. Alternatively, digital objects may be presented upon PEDs via slideshow formats or other methods.

The disclosed application may attract a following of consumers who are collectors or those who enjoy having a souvenir of a place they have been or an event witnessed. Consumers of the disclosed application do not play a game as in the related art; but instead, qualify to download a digital object by virtue of being within a designated geo fence. Consumers are either willing to go to a specific place to obtain the collectibles (digital objects) or will retrieve digital objects when they arrive at a particular location because the digital object shows that they traveled to the particular location. A purpose of the invention is to instill a sense of exclusivity in traveling to destinations as opposed to "finding" objects or solving electronic puzzles as presented in the related art.

The retrieval of ShakyGlobes™ allows consumers to make a statement about where they have traveled and allows consumers bragging rights commensurate with the difficulty in traveling to the various locations featured upon their acquired ShakyGlobes™.

These and other objects and advantages will be made apparent when considering the following detailed specification when taken in conjunction with the drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein,"

"above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

Figure 1:
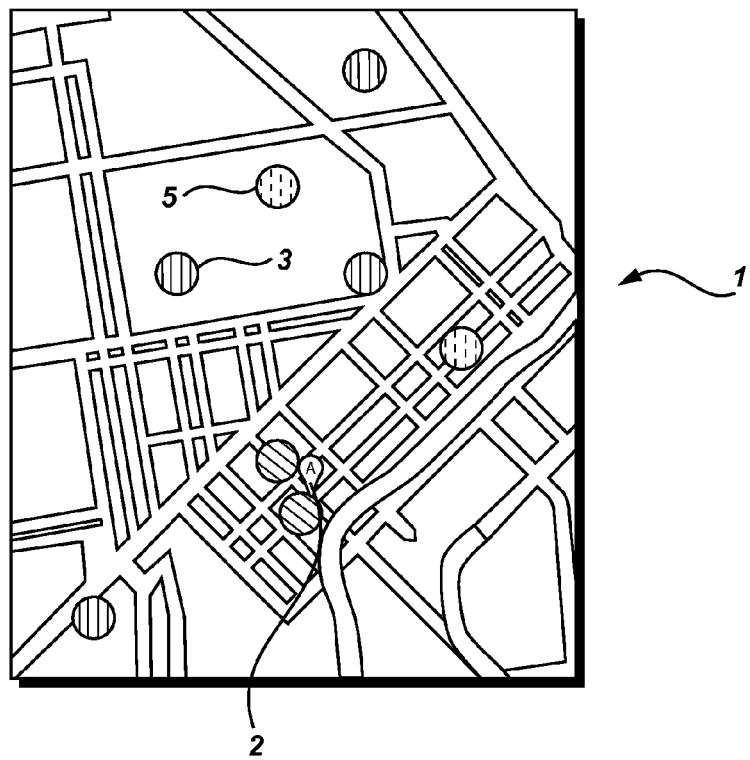
FIG. 1 is a plan view of a map with globe icons
Figure 1:
Figure 1:
Figure 1:
Figure 1:

REFERENCE NUMBERS 1 digital map with globe icons showing status and availability of items
2 a consumer's current location
3 ShakyGlobe™ or other item located within a geo-fence area and hence retrievable
4 ShakyGlobe™ or other item located outside a geo-fence area and hence not retrievable
ShakyGlobe™ or other item that has been retrieved
100 system sever and database system
101 system defined geo-fence
102 center point for geo-fence, may be defined by latitude, longitude and/or altitude
103 radius starting from center point 102 of geo-fence
104 collectable artifact (CA), digital object or item
105 attribute variables
106 market place for digital object or CA, market place is also called ShakyMarket
107 store for digital object or CA, store is also call ShakyStore
200 consumer PED located within a geo-fence area
201 consumer PED located outside of geo-fence area
300 ShakyGlobe™
301 glass dome of ShakyGlobe™
302 scene or object contained within globe
303 floaters or elements that appear to be floating within globe
304 base
305 screen settings and user interface for a digital object or item
306 GUI for adjusting the floaters or snow shown within a digital object
307 GUI for adjusting photo album settings
308 GUI for photo selection
309 GUI to align and scale a selected digital image
310 Shakyglobe™ or other object shown in a cover flow view
400 consumer located within geo-fence
401 request from a consumer to acquire a collectable artifact or digital object
402 verification from system server to allow a consumer purchase request
403 receipt of collectable artifact or digital object
404 no transfer of digital object
405 denial by system of consumer request for digital object
406 consumer located outside of geo-fence Referring to FIG. 1, various icons are used to illustrate the status or availability of ShakyGlobes™. Various colors may be used to note whether a consumer is within a ShakyGlobe™ geo-fence, outside a geo-fence or if a particular ShakyGlobe™ has been previously obtained. The map 1 shows a user's current location 2 retrievable 3 ShakyGlobes™, ShakyGlobes™ that are not retrievable 4 and ShakyGlobes™ that have already been obtained 5.

Figure 2:
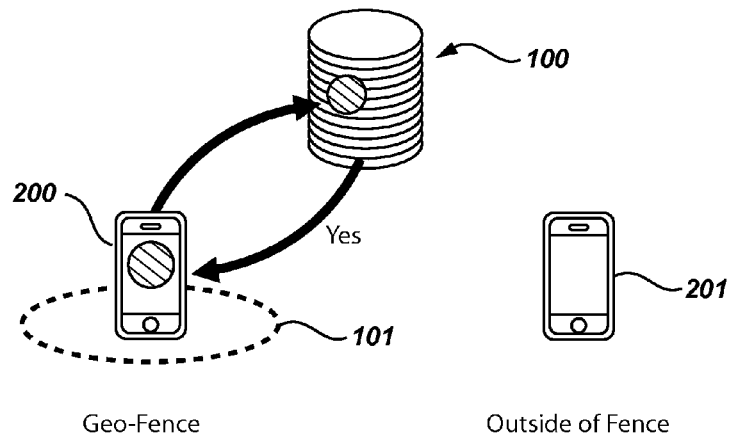
FIG. 2 is a perspective view of a PED within a geo fence

Referring to FIG. 2, a database and server system 100 is shown in communication with a PED 200 located within a geo-fence 101.

Figure 3:
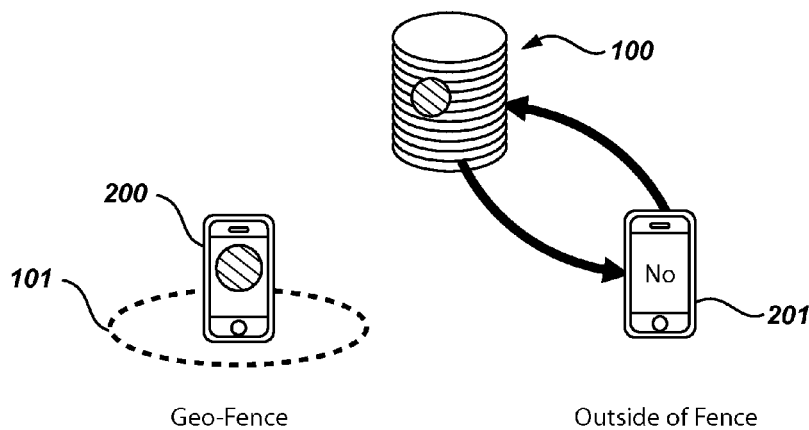
FIG. 3 is a perspective view of a PED located outside of a geo fence

Referring to FIG. 3, a PED 201 is shown outside of the boundary of a geo fence 101 and to be in communication with a database and server system 100.

Figures 4, 5:
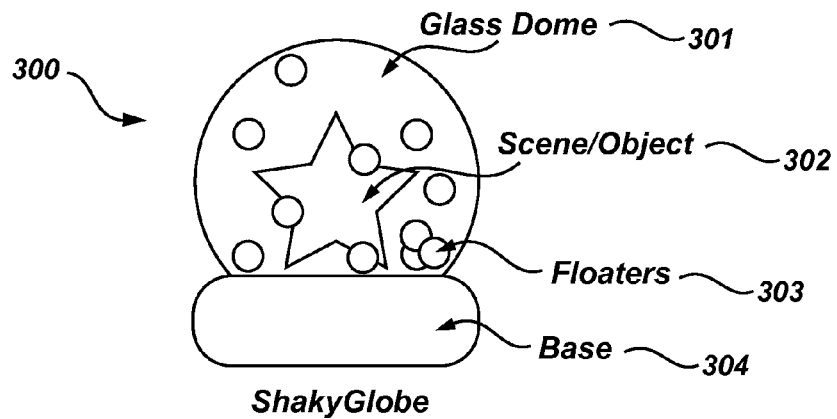
FIG. 4 is an elevation view of a ShakyGlobe™
FIG. 5 is a GUI for screen settings

Referring to FIG. 4, various parts or attributes of a ShakyGlobe™ 300 are illustrated. Scenes or objects may be configured or related to a particular location and/or event. A ShakyGlobe™ or other digital object may be comprised of a representation of a glass dome 301, scene or object 302, floaters 303 or snow flakes, and a base 304.

Referring to FIG. 5, a user interface and screen setting 305 allow a consumer control and identification of various digital item variables. In the shown example, the digital item is shown to have a unique serial number, a distribution period, location of retrieval, date of consumer receipt as well as other information.

Figure 6:
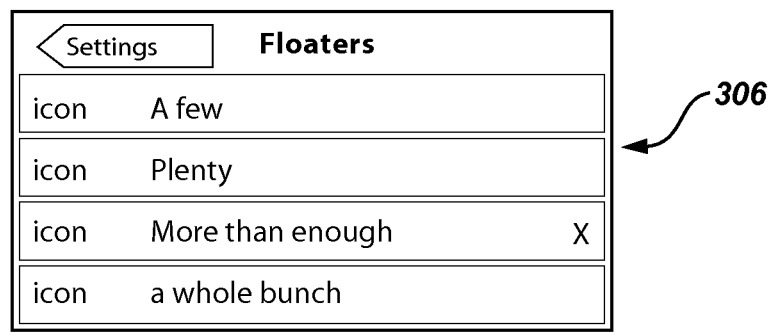
FIG. 6 is a GUI for setting the amount of snow shown within a digital object

Referring to FIG. 6, a user interface 306 to control snowflakes or floaters is presented.

Figure 7:
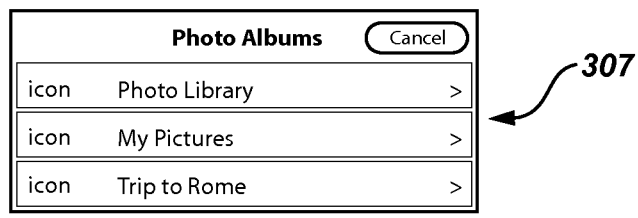
FIG. 7 is a GUI for photo album selection

Referring to FIG. 7, a user interface 307 to control or navigate photos is presented.

Figure 8:
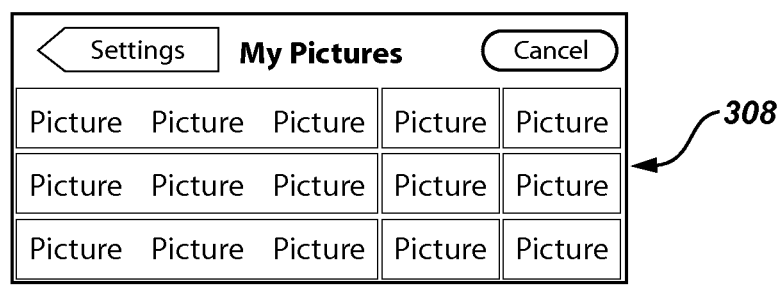
FIG. 8 is a GUI for photo selection

Referring to FIG. 8, a picture display and picture selection interface 308 is presented.

Figure 9:
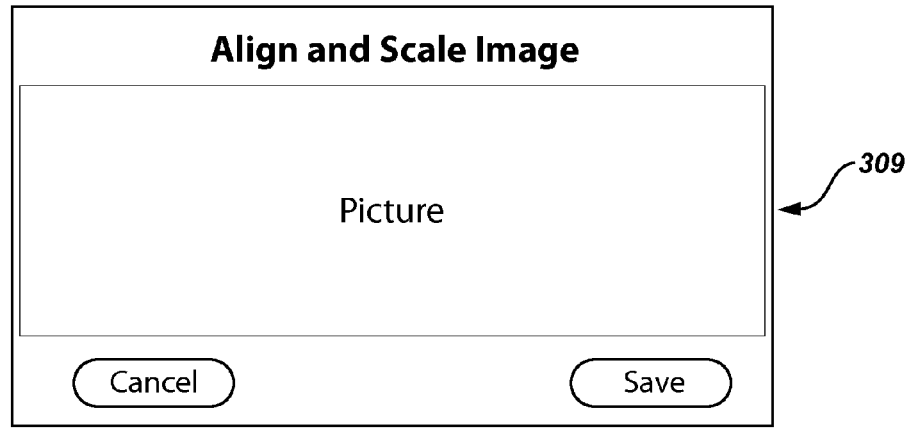
FIG. 9 is a GUI for to scale and align a chosen image

Referring to FIG. 9, an interface 309 to scale and align an image is presented.

Figure 10:
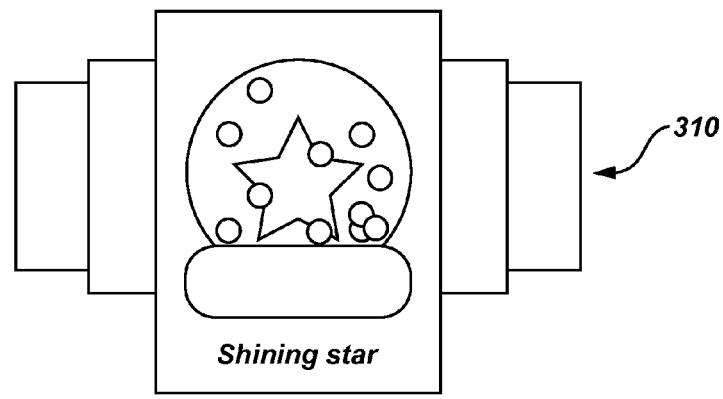
FIG. 10 is a screen shot of ShakyGlobes™ presented in a cover flow view

Referring to FIG. 10 a ShakyGlobe™ is displayed in a cover flow 310 view.

Figure 11:
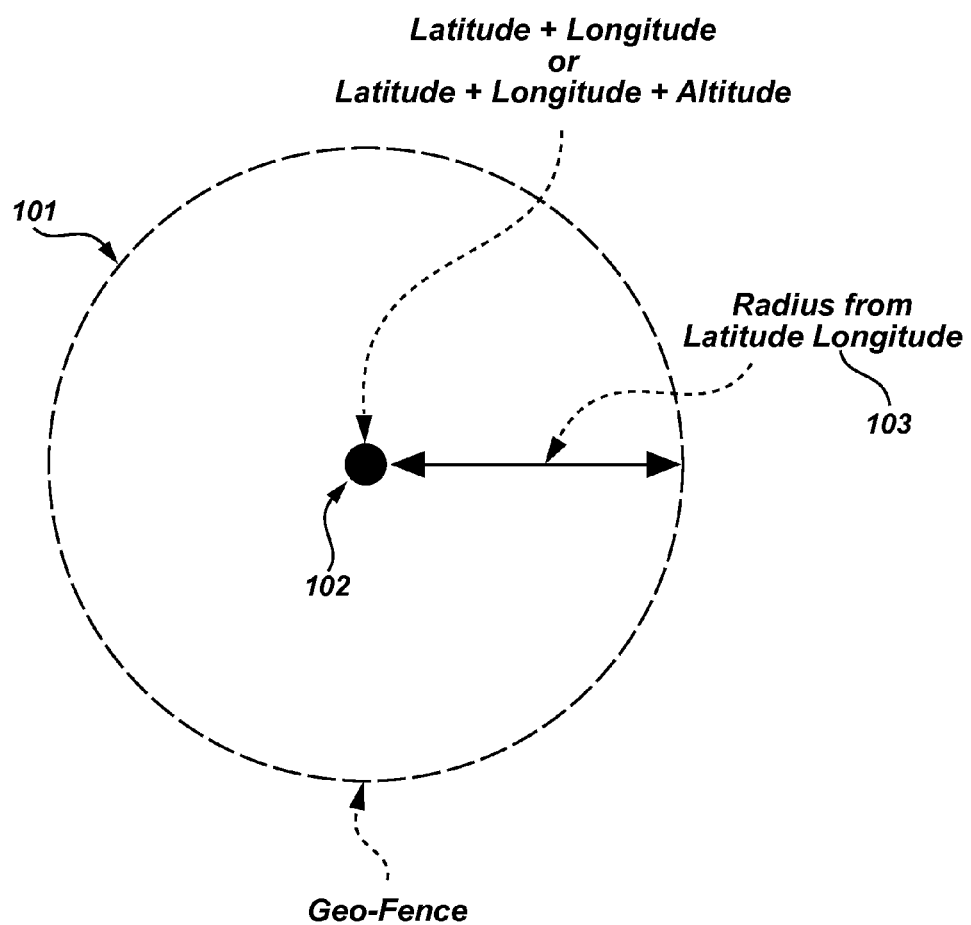
FIG. 11 is a top plan view of a geo-fence

Referring to FIG. 11, a circular shaped geo-fence 101 is shown with a center point 102 and radius 103. The center point 102 may be defined by use of a latitude, longitude and/or altitude value.

Figure 12:
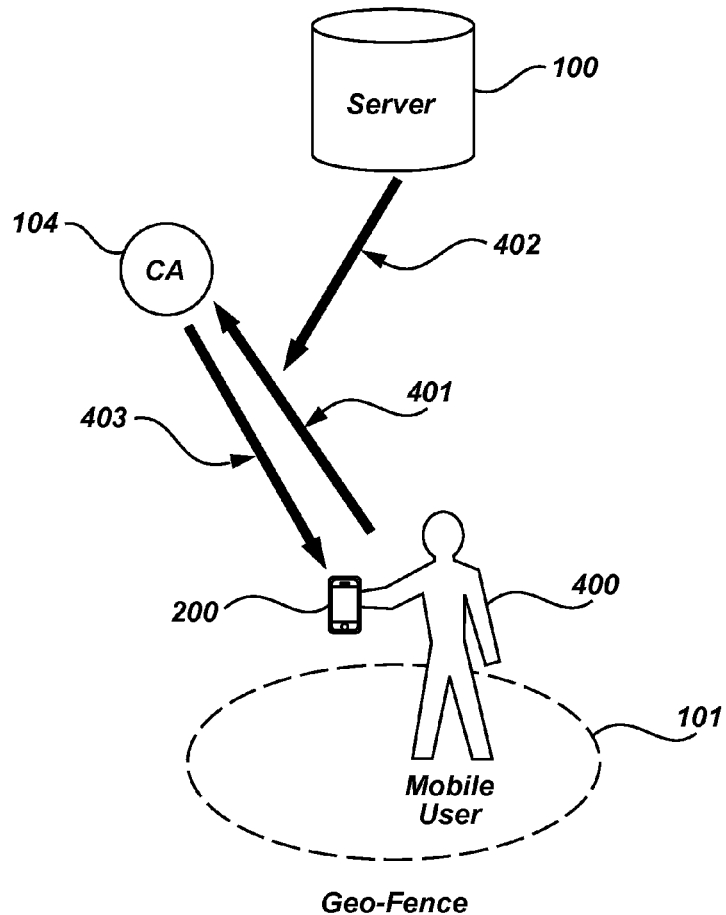
FIG. 12 is a diagram showing a successful retrieval of a digital object

Referring to FIG. 12, a consumer 400 is located within a geo-fence 101 area, requests 401 or issues a purchase order to a server and database system 100 which generates a server verification 402 that approves the purchase order resulting in the receipt 403 of a digital item 104 or collectible artifact.

Figure 13:
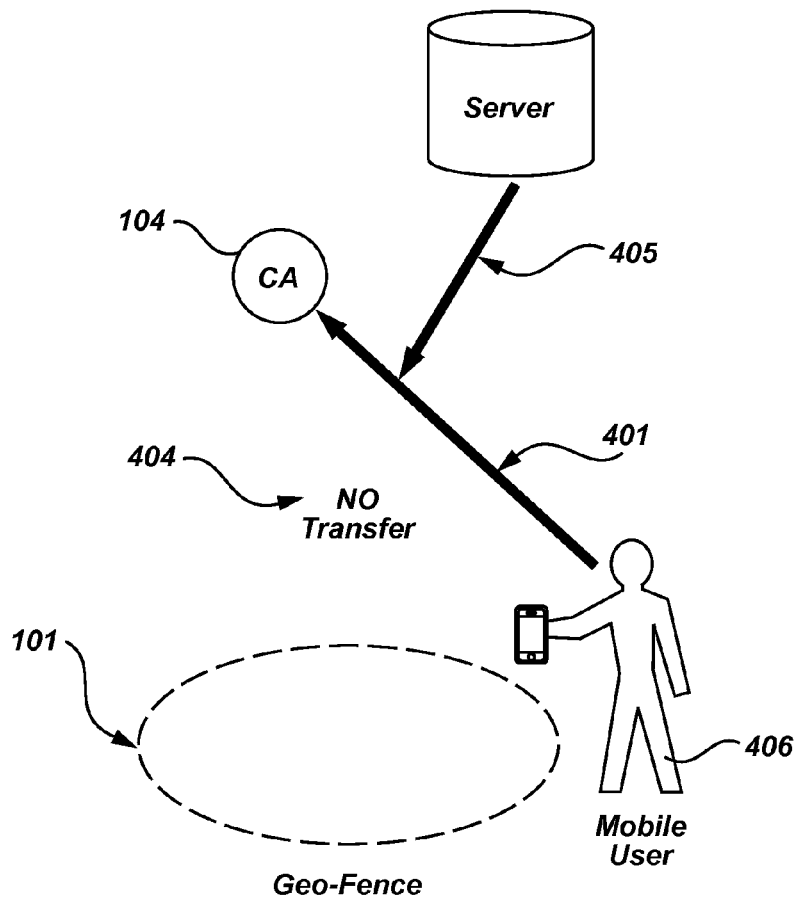
FIG. 13 is a diagram showing the unsuccessful retrieval of a digital object

Referring to FIG. 13, a server and database system 100 is in communication with a consumer 406 located outside of a geo-fence 101 area. The consumer's request 401 is denied 404 and the consumer does not receive a digital object or other item.

Figure 14:
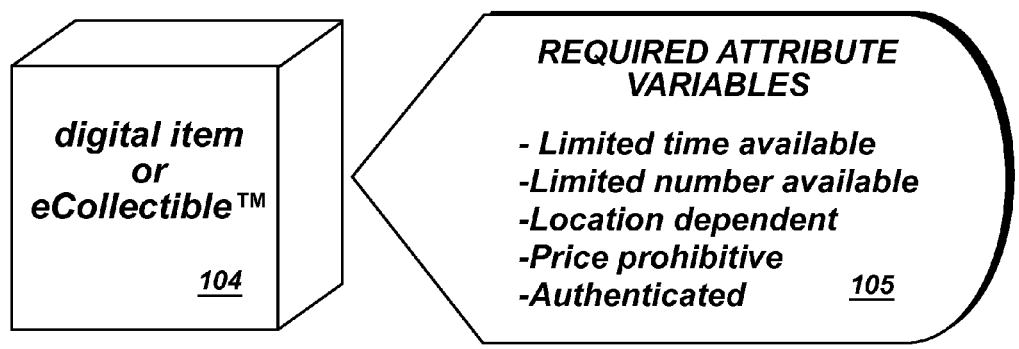
FIG. 14 is a diagram showing certain attributes of a presented digital object or item

Referring to FIG. 14, a digital object, item or eCollectible™ 104 is shown with various required attribute variables 105 that include limitations in time, location, number made, price and exclusive system server and database authentication.

Figure 15:
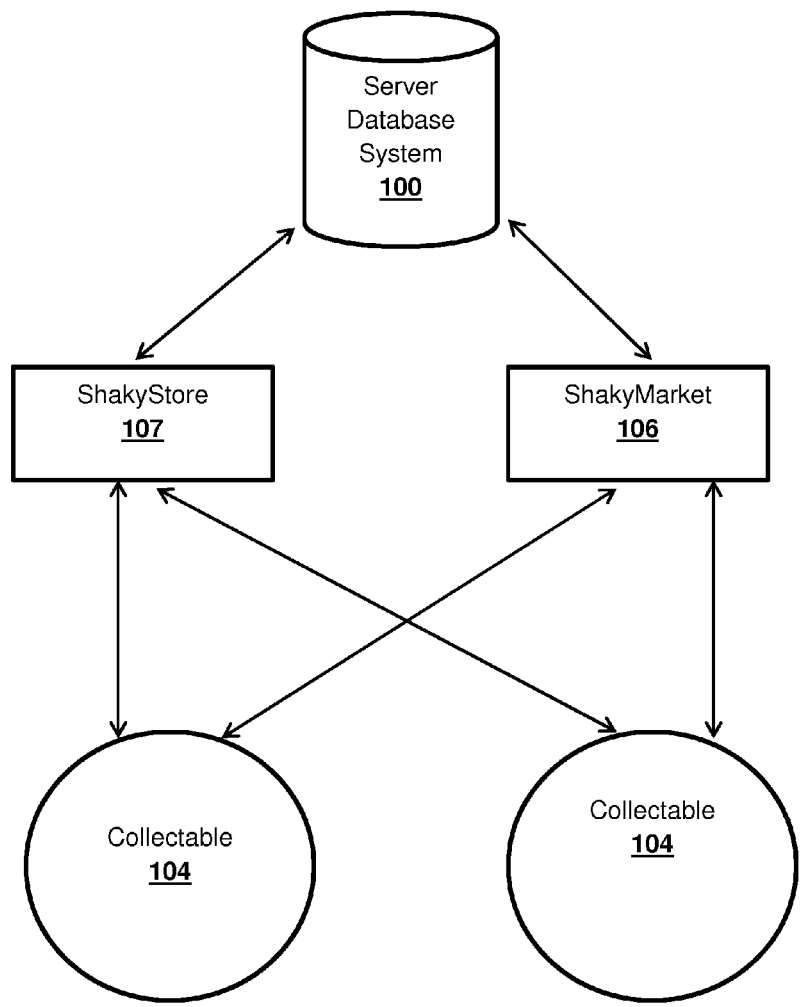
FIG. 15 is a diagram showing interactions between a store, market, server and collectable item.

Referring to FIG. 15, a server and database system 100 is in communication with a store or ShakyStore 107 which in turn may distribute collectable items or digital objects 104. A market or ShakyMarket 106 helps to facilitate a secondary market for the collectable items to be sold or transferred. The server and database system authenticates each collectable item before approving any transfer.

Figure 16:
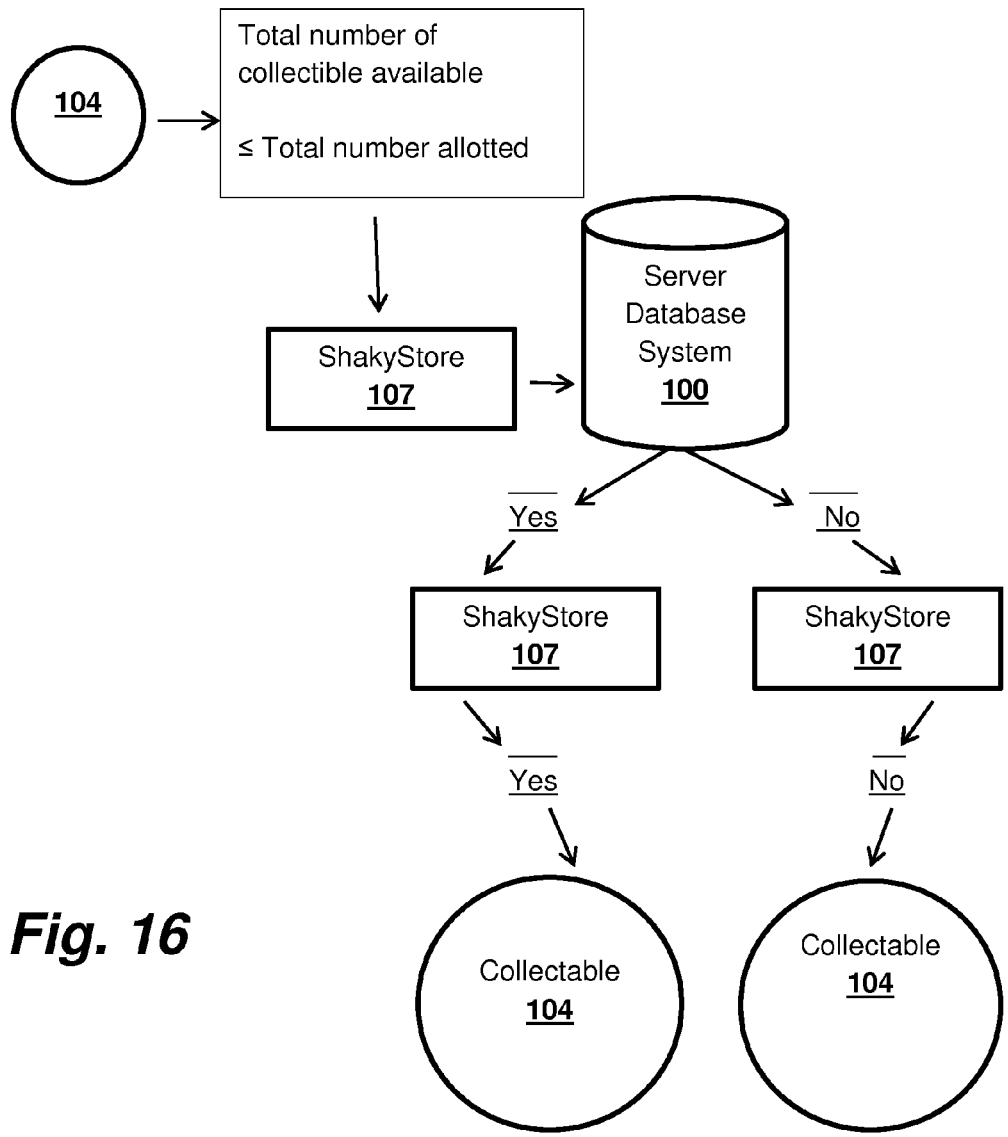
FIG. 16 is a diagram showing a quantity constraint in the sale or distribution of a collectable item.

Referring to FIG. 16, a specified number of collectible items are produced. If and when the specified number is sold, no more copies of the item will be generated.

Figure 17:
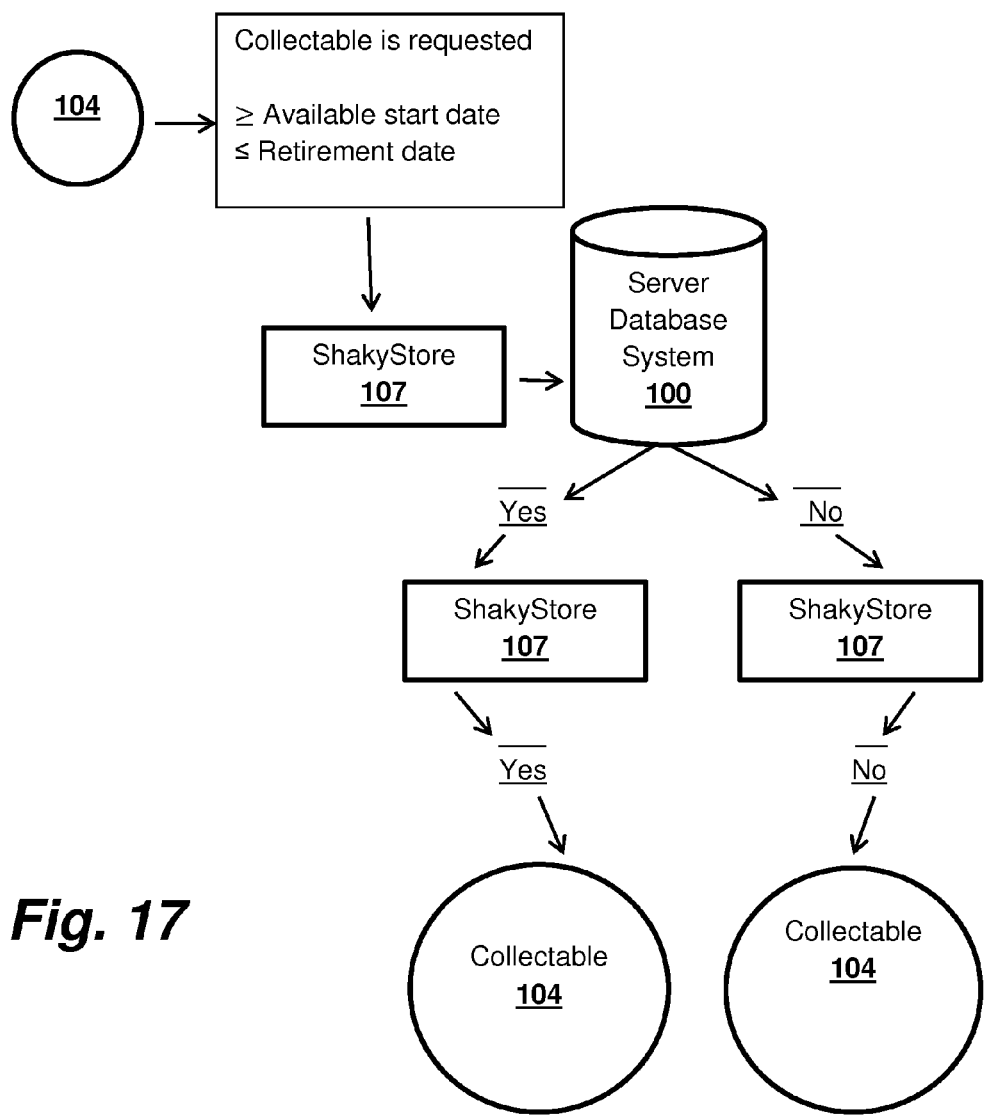
FIG. 17 is a diagram showing a time constraint in the sale or distribution of a collectable item.

Referring to FIG. 17, collectable items are produced during a designated time period only.

Embodiments of the invention include, but are not limited to the following items:

Item 1. An object exclusively distributed, exchanged and authenticated by use of protocol constraints, the protocol constraints comprising:
 a) requiring a consumer to be physically place themselves within the boundaries of a predefined geographic location;
 b) requiring a consumer to issue a purchase order within a predefined time period;
 c) requiring a consumer to agree to use a particular server and database system for registering the object, transferring the object and verifying the object; and
 d) issuing a finite number of objects and assigning to each object a serial number that includes the total number of like objects issued.

Item 2. The object of item 1 wherein the object comprises an electronic file.

Item 3. The object of item 1 wherein the protocol constraints further require the object to be prices at a rate higher than all known similar items.

Item 4. The protocol constraints of item 1 further comprising the requirement that all purchase orders are generated from a personal electronic device.

Item 5. system for creating, distributing, tracking and authenticating objects, the system comprising:
a) a special purpose machine producing a limited number of objects, with each object being numbered sequentially;
b) the special purpose machine marking each object such that the special purpose machine may subsequently authenticate the object;
c) the special purpose machine distributing the limited number of objects;
d) the special purpose machine recording the identity of each original recipient of an object; and
e) the special purpose machine recording any subsequent transfers of objects from one recipient to a new recipient and the special purpose machine authenticating each object before a subsequent transfer.

Item 6. The system of item 5 wherein an original distribution of objects is conditioned upon a recipient requesting an object within a predetermined time period.

Item 7. The system of item 5 wherein an original an original distribution of objects is conditioned upon a recipient requesting an object while within a predetermined geographic area.

Item 8. The system of item 5 wherein an original distribution of objects is conditioned upon a recipient consenting to using the system as the exclusive means of authentication.

Item 9. The system of item 5 wherein each object is branded with a third party trademark.

What is claimed is:

1. A system for creating, distributing, tracking and authenticating digital objects, the system comprising:
 A special purpose machine comprising a server, the server configured to:
 a) produce a limited number of digital objects, with each digital object being numbered sequentially;
 b) mark each digital object such that the special purpose machine may subsequently authenticate the object;
 c) distribute the limited number of digital objects;
 d) record the identity of each original recipient of the digital object;
 e) record any subsequent transfers of the digital objects from one recipient to a new recipient and authenticate each digital object before a subsequent transfer;
 f) condition an original distribution of the digital objects upon a recipient requesting a digital object within a predetermined time period;
 g) condition an original distribution of the digital objects upon a recipient requesting a digital object while located within a predetermined geographic area;
 h) condition the original distribution of the digital objects upon a recipient consenting to use the system as the exclusive means of authentication; and
 i) issue the digital objects branded with a third party trademark.

2. The system of claim 1 wherein the digital object comprises an electronic file.

3. The system of claim 1 wherein the digital object is priced at a higher rate than all known similar digital objects.

4. The system of claim 1 conditioning the request for a digital object to a recipient using a personal electronic device.

5. A method for creating, distributing, tracking and authenticating digital objects, the system comprising:
 a) producing a limited number of digital objects, with each digital object being numbered sequentially;
 b) marking each digital object such that each digital object may be authenticated;
 c) distributing the limited number of digital objects;
 d) recording the identity of each original recipient of a digital object;
 e) recording any subsequent transfers of the digital objects from one recipient to a new recipient and authenticating each digital object before a subsequent transfer;
 f) conditioning an original distribution of the digital object upon a recipient requesting a digital object within a predetermined time period;
 g) conditioning an original distribution of the digital objects upon a recipient requesting a digital object while located within a predetermined geographic area;
 h) conditioning the original distribution of the digital objects upon a recipient consenting to using the system as the exclusive means of authentication; and
 i) issuing the digital objects branded with a third party trademark.

6. The method of claim 5 including conditioning the sale of a digital object to a price higher than all known similar digital objects.

7. The method of claim 5 wherein the digital objects are comprised of electronic files.

8. The method of claim 5 including the conditioning the original distribution of the digital object to a recipient using a personal electronic device.

* * * * *